United States Patent [19]
Mueller

[11] 3,767,163
[45] Oct. 23, 1973

[54] SANITARY BUTTERFLY VALVE WITH LOCKING DUST CAP

[75] Inventor: Paul Mueller, Springfield, Mo.

[73] Assignee: Paul Mueller Company, Springfield, Mo.

[22] Filed: Apr. 14, 1971

[21] Appl. No.: 133,811

[52] U.S. Cl. ............... 251/89, 251/306, 251/287, 137/613
[51] Int. Cl. ..... F16k 35/02, F16k 51/00, F16k 1/22
[58] Field of Search............. 137/316, 613, 614.06, 137/377, 380, 381, 382, 385; 251/89, 251/286–288, 305, 306

[56] References Cited
UNITED STATES PATENTS

| 3,068,903 | 12/1962 | Haenky et al. | 137/385 X |
| 1,477,808 | 12/1923 | Costello | 137/385 |
| 2,440,946 | 5/1948 | Hansen | 137/614.06 |
| 2,828,762 | 4/1958 | Swank | 137/385 |
| 3,314,444 | 4/1967 | White | 137/377 |

Primary Examiner—Henry T. Klinksiek
Attorney—Rogers, Ezell, Eilers & Robbins

[57] ABSTRACT

This invention relates to a sanitary butterfly valve for use primarily with liquid food applications which includes a valve body with seating means therein, a pivotally mounted seat disc which is made to move into and out of engagement with the seating means, and a combination locking and dust cap at the outlet port of the valve which protects against foreign particles entering the valve and locks the valve in its closed position. The valve is so designed to be assembled and disassembled in a matter of seconds.

13 Claims, 5 Drawing Figures

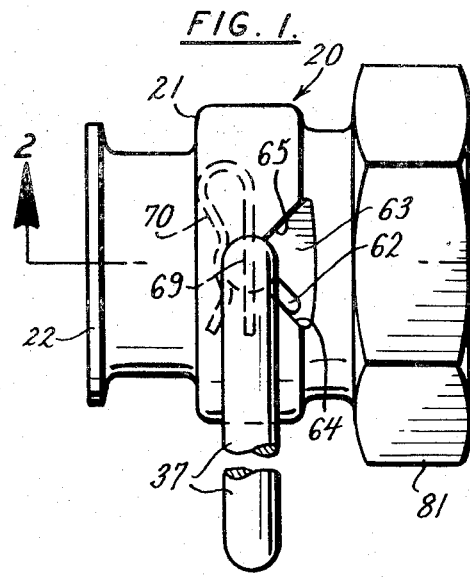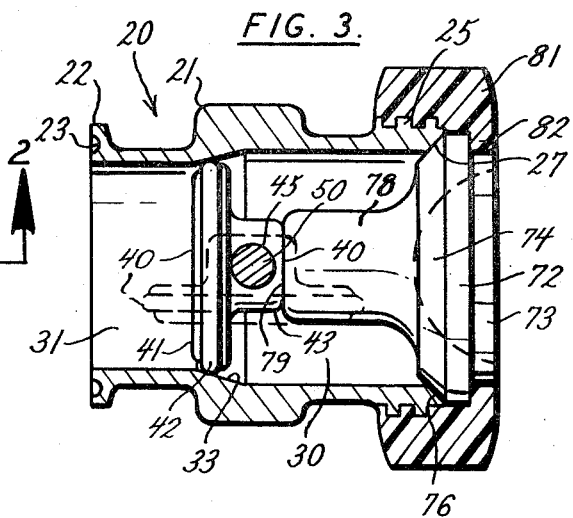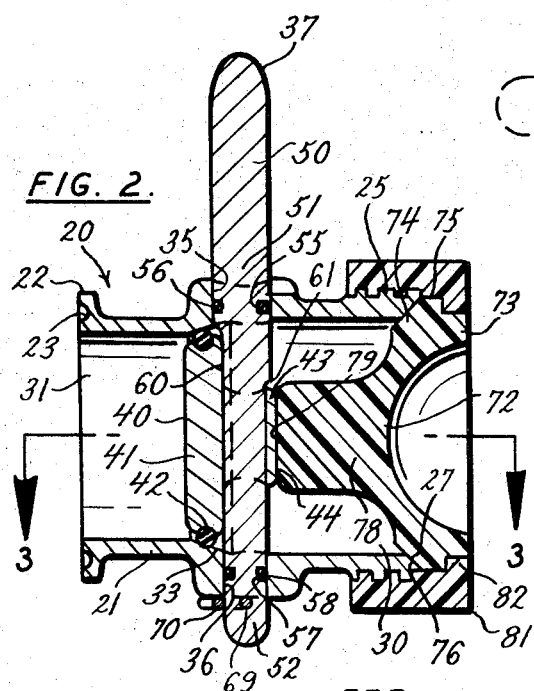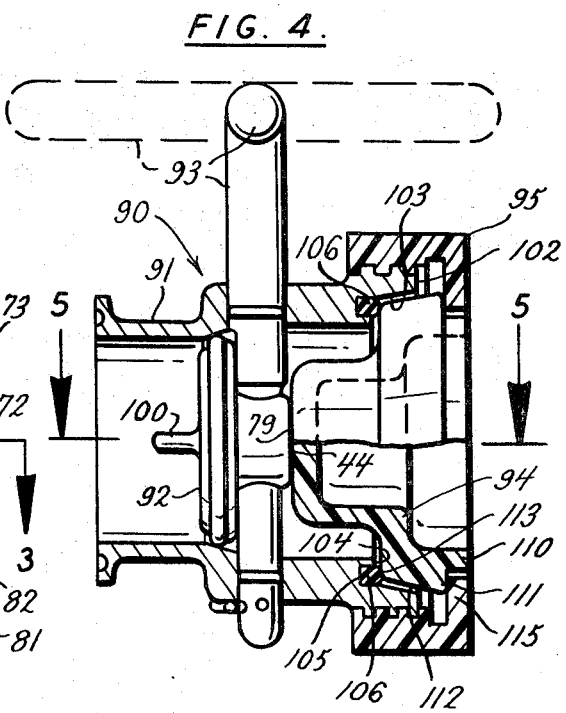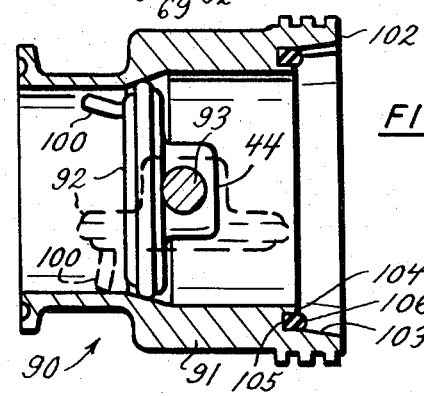

SANITARY BUTTERFLY VALVE WITH LOCKING DUST CAP

SUMMARY OF THE INVENTION

This invention relates to sanitary valves for controlling the flow of liquid foods, such as, for example, syrup, wine, beer, eggs, oil, milk, etc. Valves used for this purpose must, of course, be sanitary just as the containers in which the foods are kept, and therefore should be made from materials which lend themselves to cleanliness, easily assembled and dis-assembled for cleaning and repair, and protected internally from foreign particles that might contaminate the food.

The butterfly valve of this invention includes a valve body with a seating means therein. A butterfly disc is pivotally mounted for rotation in and out of contact with the seating means to open and close the valve. An operating handle has a hand-grip portion and a shaft portion extending through the valve body and the seat disc, and includes positive locking means to hold the disc in rotation with the shaft and for mounting the disc in pivotal movement in and out of contact with the seating means. A retaining pin or clip is provided at the lower end of the shaft to hold the shaft in its assembled position. With this design, the valve can be easily disassembled in only a few seconds by removing the clip and pulling the handle shaft out of the valve body and disc, thus freeing the disc. No tools are required.

A combination locking and dust cap which is easily mounted to the valve outlet seals the internal parts of the valve against foreign particles and contamination and also locks the valve in its closed position so that it cannot be accidentally opened by operation of the handle.

DESCRIPTION OF THE DRAWINGS

FIG. 1 is a plan view of one embodiment of the valve in this invention;

FIG. 2 is a view in section taken along the line 2—2 of FIG. 1;

FIG. 3 is a view in partial section taken along the line 3—3 of FIG. 2 with the butterfly shown in its closed position by solid lines and its open position by dashed lines;

FIG. 4 is a view in partial section of another embodiment of the valve of this invention; and FIG. 5 is a view taken along the line 5—5 of FIG. 4 without the locking and dust cap and hex nut, and with the butterfly seat disc shown in its closed position by solid lines and its open position by dashed lines.

DETAILED DESCRIPTION OF PREFERRED EMBODIMENTS

In FIGS. 1, 2 and 3 there is shown the butterfly valve 20 of the one embodiment of this invention. The valve 20 includes a hollow, cylindrical body 21 with a flanged end 22 providing a surface for mounting the valve to a suitable tank (not shown) containing liquid foods such as milk, syrup, wine, beer, eggs, oil, etc. The flanged end 22 has a recess 23 therein for receiving a suitable gasket (not shown) to provide a liquid and air-tight seal between the valve body and the container. External threads 25 of a sanitary design are located at the outlet end 27 of the valve body which end is beveled inwardly to provide a seat for a dust cap to be described. Internally the valve body 21 has a cylindrical cavity 30 and a cylindrical cavity 31 smaller in diameter than the cavity 30. The wall of the cavity 30 is tapered toward the wall of the cavity 31 to form a valve seat 33. At approximately the position of the seat 33 are diametrically aligned holes 35 and 36 in the body wall to receive an operating handle 37 to be described, the hole 35 being somewhat larger than the hole 36.

A seat disc 40 has a disc portion 41 with an O-ring seal 42 seated around its perimeter, and a forwardly protruding portion 43 of smaller diameter than the disc portion 41. The protrusion 43 has a flat end 44 and a diametrical bore 45 therethrough. The bore 45 is positioned such that its wall is contiguous with the front wall of the disc portion 41, and when in alignment with the holes 35 and 36 in the valve body 21 by insertion of the operating handle 37, the seat disc 40 pivots about the bore axis in and out of sealing relation with the seat 33 as best shown in FIG. 3.

The handle 37 is shown to be L-shaped, although any other suitable shape such as a T could be used. The handle 37 has a vertical shaft 50 with an upper portion 51 of a diameter to mate with the hole 35 and a lower portion 52 of a smaller diameter to mate with the hole 36. A peripheral groove 55 holds an O-ring 56 to form a liquid-and-air-tight seal between the upper portion 51 and the hole 35, and a peripheral groove 57 holds an O-ring 58 to form a liquid-and-air-tight seal between the lower portion 52 and the hole 36. The shaft 50 is round except at the lower end of the upper portion 51 which has a flat side 60 which rests against the front surface of the disc portion 41 to lock the seat disc 40 into rotational engagement with the shaft 50. The upper and lower portions of the shaft 50 join in a taper at 61 which tends to force the flat surface 60 firmly against the front surface of the disc portion 41 thus providing a very positive, no slack, operation of the valve.

A pin 62 extends normal to the shaft 50 and rides in an external fan-shaped recess 63 in the valve body. The pin 62 acts as a stop against the sides 64 and 65 of the recess 63 to limit the pivotal movement of the seat disc 41. With the sides 64 and 65 formed at ninety degrees, turning the handle 37 between its stops, pivots the seat disc between the seating position shown by solid lines and the open position shown by dashes lines in FIG. 3. An aperture 69 extends through the bottom end of the shaft 50 just below the outer surface of the valve body to receive a retaining pin 70.

A combination locking and dust cap 72 is mounted at the outlet of the valve to protect against foreign particles entering the valve and possibly contaminating the food, and includes a front ring surface 73 and an annular shoulder 74 outwardly extending therefrom. The shoulder 74 has an outer surface 75 of a diameter approximately equal to that of the inside diameter of the threads 25. A bevelled surface 76 extends rearwardly from the outer edge 75 to form a mating surface with that of the bevelled end 27 of the valve body. The back of the cap 72 is formed in a rearwardly protruding cylindrical portion 78 having a flat end 79 which mates with the flat end 44 of the seat disc 40 when in its seating position and when the cap 72 is mounted in place to effectively lock the disc 40 in its seating position. An internally threaded nut 81 has an inwardly extending annular shoulder 82 which mates with the annular shoulder 74 of the cap 72. The internal threads of the nut 81 mate with the threads 25. While the nut 81 is shown as a hex nut, any suitable design could be used, although it is preferred that some gripping means be provided on the external surface of the nut so that it may be easily tightened and removed by hand.

ASSEMBLY AND DIS-ASSEMBLY

To assemble the valve of this embodiment, the seat disc 40 is placed in its open position with the O-ring 42 resting against the tapered surface 33 and with the bore 45 aligned with the holes 35 and 36. With the handle 37 held with its flat surface 60 on the shaft 50 facing the disc portion 41, the shaft 50 is inserted down through the hole 35, bore 45, and hole 36 so that the flat surface 60 rests snugly against the front surface of the disc portion 41 and until the pin 62 lies in the recess 63 of the valve body. The retaining clip 70 is then inserted into the aperture 69 to hold the shaft 50 in place. The valve is then operated by simply turning the handle 37 between its stops.

The combination locking and dust cap is installed by inserting its rear portion 78 into the front end of the valve body so that the flat end 79 rests against the flat end 44 of the disc 40 and its bevelled surface 76 rests against the bevelled surface 27 of the valve body. The hex nut 81 is then screwed onto the end of the valve body to hold the cap 72 tightly in place.

The unit is dis-assembled such as for cleaning or repair by simply removing the nut and dust cap, rotating the disc 40 to the open position, removing the retaining clip 70, and pulling the shaft 50 of the handle 37 out of the holes 35 and 36 and the bore 45 to free the seat disc 40. Hence, with the O-rings in place, assembly and dis-assembly takes only a few seconds and no tools are required.

In FIGS. 4 and 5, there is shown another embodiment of the invention. Because this embodiment is so very similar to that first described, only material differences will be noted and described. Hence, there is shown a valve 90 having a valve body 91 similar to and performing the same function as the valve body 21, a seat disc 92 similar to and performing the same function as the seat disc 40, a handle 93 similar to and performing the same function as the handle 37, a combination locking and dust cap 94 similar to and performing the same function as the cap 72, and a nut 95 similar to and performing the same function as the nut 81. The only material differences in this embodiment are in the means for limiting pivotal movement of the disc, and the means for seating the combination locking and dust cap at the outlet of the valve body.

In place of the pin 62 and fan-shaped recess 63 of the first described embodiment, this embodiment uses a pin 100 attached to the disc 92 near its periphery on an axis at 90° to its pivotal axis. The pin 100 extends toward the valve inlet and is on the side of the disc 92 that moves toward the valve inlet when the disc is pivoted from its closed to its open position, and its length is such that when the disc is in its open position, the end of the pin strikes the inside wall of the valve body to limit pivotal movement to approximately 90° as illustrated by dashed lines in FIG. 5.

Instead of the bevelled surfaces 27 and 76 of the first described embodiment, the valve outlet of this embodiment has a flat portion 102 joined by a steeply tapered rearwardly extending annular surface 103 formed at its base in a shoulder 104. The shoulder 104 contains an annular groove 105 for receiving a ring seal 106 of any suitable cross-section such as that shown in FIGS. 4 and 5. The cap 94 includes a ring portion 110 formed with an outwardly extending annular shoulder 111 with an annular surface 112 extending rearwardly therefrom and tapered substantially parallel to the tapered surface 103 and formed at its back end in an annular shoulder 113 which rests against the seal 106. The nut 95 has an inwardly extending annular shoulder 115 which mates with the shoulder 111 of the cap 94 to force the shoulder 113 against the seal 106 and the flat surface 79 of the cap 94 against the flat surface 44 of the disc 92.

Assembly and dis-assembly of the valve of this embodiment is substantially identical to the first described embodiment.

Materials used for the various parts of the valves of this invention should be those most suited for sanitary purposes. Therefore, stainless steel is preferred for the valve body, handle, seat disc, retaining clip and pin, while plastic can be used for the combination locking and dust cap and nut, although other suitable materials could also be used.

Therefore, there has been described a novel butterfly valve which can be assembled and dis-assembled in only a few seconds while providing positive seating, and includes a combination locking and dust cap which prevents accidental opening of the valve and seals its internal parts against foreign particles.

Various changes and modifications may be made within the invention as will be readily apparent to those skilled in the art. Such changes and modifications are within the scope and teaching of this invention as defined by the claims appended hereto.

What is claimed is:

1. A sanitary valve comprising a valve body having an inlet port and an outlet port, annular seating means within the valve body, a removable dust cap, a seat disc mounted within the valve body for pivotal movement into and out of seating relation with the seating means to close and open the valve when the dust cap is removed, means externally operable for pivoting the seat disc between its closed and opened positions, and a dust cap mounted at one of the valve ports, the dust cap including means for locking the seat disc in its closed position and for providing an air-tight seal at the valve port for preventing foreign particles from entering the valve through the port.

2. The sanitary valve of claim 1 wherein the seat disc and the dust cap have surfaces which contact when the seat disc is closed and the dust cap is mounted in place to lock the seat disc in its closed position and prevent operation of the pivotal means.

3. The sanitary valve of claim 1 wherein the dust cap and valve port where the cap is mounted have mating bevelled surfaces and including means for holding the bevelled surface of the dust cap tightly against the bevelled surface of the port to provide the seal for preventing foreign particles from entering the valve through the port.

4. The sanitary valve of claim 1 wherein the dust cap and valve port where the cap is mounted, have mating annular shoulders, one of which shoulders has an annular recess, a sealing ring mounted in the recess, and means for holding the other annular shoulder tightly against the sealing ring to provide the seal for preventing foreign particles from entering the valve through the port.

5. The sanitary valve of claim 1 wherein the seat disc has a portion with a diametrical bore therethrough, the valve body having diametrically aligned holes that are also aligned with the bore in the seat disc when the seat disc is in closed contact with the sealing means, a shaft extending through the holes and the bore means keying the seat disc into locking rotational engagement with the shaft, and means attached to said shaft for preventing movement thereof along its longitudinal axis within the holes and bore.

6. The sanitary valve of claim 5 wherein the seat disc includes a disc portion having a peripheral seal thereon for engagement with the seating means, and a protrusion of a smaller diameter than and normal to the disc portion, the bore being in the protrusion substantially adjacent the wall of the disc portion, one of the holes being larger than the other, the shaft having a first portion and a second portion of smaller diameter than the first portion, the first portion extending through the larger hole, and the second portion extending through the bore and the smaller hole, the first portion having a flat surface on one side next to the second portion which engages the wall of the disc portion to firmly lock the seat disc in rotational engagement with the shaft.

7. The sanitary valve of claim 5 including means operatively coupling the seat disc and the valve body for limiting the rotation of the seat disc between its closed position and a predetermined open position.

8. The sanitary valve of claim 7 wherein the last named means includes a fan-shaped recess in the outer surface of the valve body adjacent the shaft, and a pin extending normal to the shaft and which moves within the fan-shaped recess.

9. The sanitary valve of claim 7 wherein the last named means includes a pin extending substantially normal from the seat disc, near its periphery, which pin is of a prescribed length to engage the internal surface of the valve body when the valve is opened a predetermined amount to limit rotation of the seat disc to its open position.

10. The sanitary valve of claim 5 including sealing means between the valve body and the shaft.

11. A sanitary valve comprising a valve body having an inlet port and an outlet port, annular seating means within the valve body, a seat disc having a peripheral seal that mates with the seating means and a portion having a diametrical bore therethrough, the valve body having diametrically aligned holes that are also aligned with the bore in the seat disc when the seat disc is in closed contact with the sealing means, an externally operable shaft extending through the holes and the bore including means for keying the seat disc into locking rotational engagement with the shaft, means attached to the shaft for holding the shaft in the holes and bore whereby removal of the shaft releases the seat disc, means external of said valve body carried by the shaft for rotation thereof, and a dust cap mounted at an outlet of the valve including means for locking the seat disc in its closed position and for providing an air-tight seal at the valve outlet to prevent foreign particles from entering the valve therethrough.

12. A sanitary valve which can be assembled and disassembled quickly and easily for cleaning and repair without the use of tools and comprising a valve body having entrance and exit ports, annular seating means within the valve body, a seat disc of a size permitting passage thereof through one of said ports and having a peripheral seal that mates with the seating means, the seat disc including a portion having a diametrical bore therethrough, the valve body having diametrically aligned holes that are also aligned with the bore in the seat disc, and a rotatable, externally operable removable shaft extending through the holes and the bore and adapted to lockingly engage the bore to prevent rotation of the seat disc with respect to the shaft, externally disengageable means connected to said shaft for prevention of longitudinal movement thereof within the holes and bore, and a dust cap mounted at an outlet of the valve and including locking means extending inwardly of the valve for contacting the seat disc to lock the same in its closed position and including means for providing an air-tight seal at the valve outlet to prevent foreign particles from entering the valve therethrough.

13. The sanitary valve of claim 12 wherein end portions of said shaft extend externally of said valve body, one end carrying a handle for manual rotation of the shaft and associated seat disc, and the other end having attached thereto said externally disengageable means for preventing longitudinal movement of the shaft within the holes and bore.

* * * * *